United States Patent
Rodecker et al.

(10) Patent No.: US 11,294,742 B2
(45) Date of Patent: Apr. 5, 2022

(54) INFORMATION MANAGEMENT SYSTEM ROUTER

(71) Applicant: Bank of America Corporation, Charlotte, NC (US)

(72) Inventors: Richard D. Rodecker, Lincolnton, NC (US); Mark A. Frazier, Freeland, MI (US)

(73) Assignee: Bank of America Corporation, Charlotte, NC (US)

(*) Notice: Subject to any disclaimer, the term of this patent is extended or adjusted under 35 U.S.C. 154(b) by 64 days.

(21) Appl. No.: 16/359,421

(22) Filed: Mar. 20, 2019

(65) Prior Publication Data

US 2020/0301767 A1    Sep. 24, 2020

(51) Int. Cl.
G06F 9/54 (2006.01)
G06F 11/36 (2006.01)
G06F 9/445 (2018.01)
G06F 9/46 (2006.01)

(52) U.S. Cl.
CPC .......... *G06F 9/546* (2013.01); *G06F 9/44505* (2013.01); *G06F 9/466* (2013.01); *G06F 11/3672* (2013.01)

(58) Field of Classification Search
None
See application file for complete search history.

(56) References Cited

U.S. PATENT DOCUMENTS

| | | | |
|---|---|---|---|
| 7,337,199 B2 | 2/2008 | Fisher | |
| 7,428,726 B1* | 9/2008 | Cowan | G06F 11/368 717/121 |
| 8,533,667 B2 | 9/2013 | Alexander et al. | |
| 8,640,144 B2 | 1/2014 | Dinh et al. | |
| 9,098,557 B2 | 8/2015 | Mansur et al. | |
| 9,218,226 B2 | 12/2015 | Lubrano | |
| 9,336,067 B2 | 5/2016 | Lubrano | |
| 9,622,022 B2 | 4/2017 | Yim et al. | |
| 9,674,293 B2 | 6/2017 | Lubrano | |
| 10,142,439 B2 | 11/2018 | Pekar et al. | |
| 2008/0091837 A1* | 4/2008 | Langen | H04L 65/40 709/230 |
| 2015/0113517 A1* | 4/2015 | Bennah | G06F 8/65 717/170 |
| 2016/0077953 A1* | 3/2016 | Bielski | G06Q 10/00 717/101 |
| 2017/0187761 A1* | 6/2017 | Zhu | H04L 67/34 |
| 2019/0163459 A1* | 5/2019 | Sreenivasa | G06F 9/547 |
| 2019/0163504 A1* | 5/2019 | Glazer | G06F 3/0484 |

* cited by examiner

*Primary Examiner* — Chat C Do
*Assistant Examiner* — William C Wood
(74) *Attorney, Agent, or Firm* — Banner & Witcott, Ltd.

(57) ABSTRACT

Systems and methods for routing information management system (IMS) messages to support multiple levels in an information management system environment. In some cases, a transaction code routing and classification scheme may be used to achieve isolation within an information management system for multiple development efforts occurring in one test system. An IMS router may intercept all transactions to determine a test level desired to process the transactions. At interception time, a destination is changed by the IMS router. The re-routed transactions are processed in separate data containers using unique programs, databases, user interfaces and formatting, based on requirements for a particular testing level.

20 Claims, 4 Drawing Sheets

INFORMATION MANAGEMENT SYSTEM ROUTER

BACKGROUND

Aspects of the disclosure relate to computer systems for software development and testing. One or more aspects of the disclosure relate to managing communications for remote software/application testing, including routing messages from a plurality of remote computing devices to a specified one of multiple logical testing environments configured in a physical environment.

In large enterprises, software may be developed as a collaborative effort amongst a plurality of developers and testers, each assigned to a particular software and/or application development project. For example, depending on the complexity of the software and/or application project, the team may include upwards of 20 or more developers and testers working in parallel to develop and test the software. In worldwide enterprises, the developers and testers may be spread across various locations, including different states and/or countries. Having developers and testers located in geographically different locations, poses many unique problems.

A typical software development and testing environment necessitates a complex set-up in which the final production/use environment needs to be mimicked at the development level and during testing. In other words, developers and testers need the ability to work with the software and/or application in an environment that simulates the final production environment, for example, a web server environment. Such a final production/use environment provides confidence of the software and/or application to be ready for use and hosted on remote servers.

In most software development environments each developer or tester may have their respective local computing device (i.e., personal computer, laptop or the like) configured with the same or compatible development or testing software as others working on a project. For example, a developer's local computing devices may be configured as both an application development server to enable coding and an application deployment server that mimics the deployment environment and enables debugging of the application while the software/application is being developed. As changes are made to the software, the developer check-ins their respective changes to a central repository (i.e., source control system), which synchronizes the various updates/check-ins from the various developers and correlates the synchronized updates with a stored baseline version of the software/application being developed. When the developer desires to continue the development process, the developer check-outs, from the data repository, the latest baseline version of the software and/or application, which reflects the latest check-ins. Similarly, a software or application tester may also have a local computing device configured with testing software configured to test one or more versions of software and/or application stored in the data repository. Often, one or more testers may each be tasked with testing a different build of the software and/or may be tasked with testing operation on one or more different operating environments or data sets.

In an illustrative example, an information management system may be used by an enterprise for development and testing of a transaction based application. Additionally, the development and testing of the application may be tasked to different teams of developers and testers, each team being tasked with the development, debugging, testing of particular features and/or functionality. In many cases, these development and testing activities may be done in parallel, where the code and application builds may be centrally located to facilitate these activities. However, in some cases, the IMS may only allow a single application to be operated within a given installation. As a result, any development and testing would necessarily be done a same version or build of the application, thus defeating the purpose and time advantages of parallel development. In a standard IMS deployment, any different version of the build would require additional infrastructure (e.g., servers, memory, data storage devices, licensed copies of IMS software, and the like). Many business organizations operating and developing large and/or mission critical applications may desire multiple (e.g., 2, 5, 10, 20, or more) testing environments each for testing different builds of the application, where some builds may include one or more features incompatible with others. In such cases, testing efficiency may need to be sacrificed due to cost concerns, in based on operating costs, processing power costs, and manpower support costs associated with an escalating number of IMS installations that would be required for the desired number of testing environments. As such, a need has been recognized to utilize features of an IMS installation to allow a single IMS installation to support multiple copies of an application to support concurrent development and testing activities, while minimizing hardware, processing power and manpower costs and requirements.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately evaluating instruments for authenticity and validity.

In some examples, an application provided by a business organization may undergo concurrent development and/or testing activities over an enterprise computing network. In some cases, features of a centralized computing environment, such as an information management system, may be leveraged to allow for these concurrent development and/or testing activities to be performed by the single information management system environment, while minimizing hardware and processing costs.

Aspects of this disclosure describe use of message switching and message routing to support multiple logical Information Management System (IMS) environments in a single physical IMS environment. For example, an IMS computing system environment may include scheduling functions to prioritize and/or manage communications between user devices and the IMS computing device. Such messages may be customized and/or leveraged by inserting custom code to manage custom routing of messages based on one or more parameters. For example, the customized messaging functions may be used to specify an intended logical testing environment a user wishes to access by altering program and/or transaction names to cause the IMS to schedule work at the specified level. Also, one or more support applications may be used to allow a user to configure communications and/or route their access over a network to trace and/or debug routing flows. Customizing scheduling communication involves a deep understanding of IMS internal scheduling functionality. Often, individuals having such skill sets are often not available to develop the required custom functionality and/or necessary redesigns of legacy IMS footprints may be cost prohibitive.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
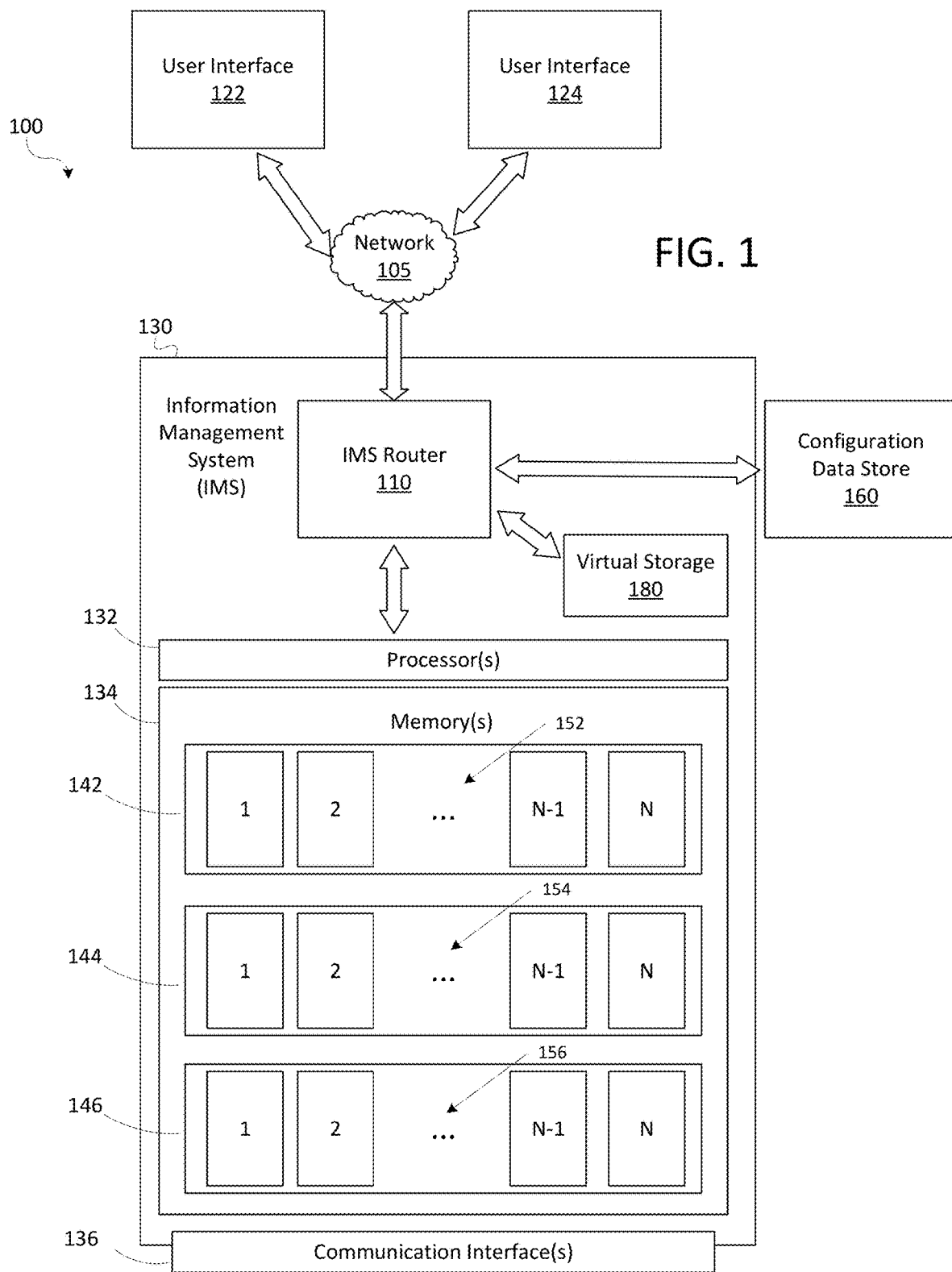
FIG. 1 shows an illustrative computing environment for implementing an information management system router in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

To accommodate multiple concurrent development activities, this disclosure describes an illustrative system including multiple logical testing environments or "levels" in one physical environment (e.g., an information management system). In doing so, development activities may occur in parallel resulting in a significantly reduced physical footprint for comparable configurations in traditional deployments. As such, an enterprise may ensure significant savings in equipment and software costs, computing resources, and manpower.

As mentioned above, an information management system environment may be configured to support a single application with a particular given name in a region. However, with this limitation, multiple users performing concurrent testing on different versions and/or builds of the application would not be possible. For example, a business organization (e.g., a financial institution) may have developed a transaction based application that allows user to access to one or more user accounts. For example, illustrative transactions may allow a user to deposit a monetary amount into one or more accounts, transfer money between accounts, withdraw a monetary amount from the account, and the like.

Because customers of the financial institution rely upon such applications being always available, development of new features and maintenance functions of existing functionality must occur in parallel requiring multiple testers and/or developers to work concurrently. However, because an IMS environment may only allow a single application of a given name, concurrent testing could not be supported without the significant added expense of building additional infrastructure to support additional IMS environments. However, the IMS router, through customization of existing functionality of the information management system, modifies scheduling functionality of the IMS environment to support "levelization" of the IMS system environment. For example, a first user may be assigned to test functionality associated with a first level of an application and a second user may be assigned to test functionality associated with a second level of the application, where each level may correspond to a different build of the application software.

FIG. 1 shows an illustrative computing environment 100 for implementing an information management system router 110 in accordance with one or more aspects described herein. The computing environment 100 may include the IMS router 110 communicatively coupled through a network 105 to one or more user interface devices 122, 124 (e.g., workstations, personal computers, and the like). Each user interface device 122, 124 may be associated with a different user tasked with testing an application. The IMS router 110 may include or may otherwise access a configuration data store 160 (e.g., a database or other data repository) including configuration information associated with users of the user interface devices 122, 124. The IMS router 110 may process messages received from the user devices 122, 124 based on configuration information stored in the configuration data store 160 when routing messages to an IMS environment 130.

In general, the IMS 130 may be used to facilitate the storage, organization, and retrieval of information, such as different builds of an application program and associated data that may be used in testing of the application program. In many cases, the IMS 130 may be a transaction based environment and may include a database manager module, a transaction manager module, and/or a system services module providing functionality common to both the database manager module and the transaction manager module. The functions processed by these modules allow the IMS 130 to provide continuous availability to the application program functionality while maintaining data integrity. As such, the IMS 130 may deliver accurate, consistent, timely, and critical information to application programs, which in turn, allow simultaneous access to this information to multiple users.

The IMS 130 may operate on one or more servers having one or more processors 132 and one or more memory devices 134. Over time, the provider of the IMS 130 may provide many new features where older features may have been wholly or partially superseded by the newer features that provide better functionality. Application programs and/or application testing routines utilizing IMS functionality can be written in a number of programming languages including, for example, Assembler, C/C++, COBOL, Java, Pascal, PL/I, and REXX. Additionally, the applications may access IMS resources by calling a number of standard IMS functions that may be provided in one or more application programming interfaces (APIs).

In some cases, a database manager module may maintain data integrity such that each database is guaranteed to be consistent and guaranteed to remain in the database and the database structure and relationships between the database elements can be defined. The database manager module of the IMS 130 may provide a central point of control and access for the data stored and processed by IMS applications. The database manager module may also may allow multiple database transactions to be performed concurrently, where the results of each transaction may be kept isolated from each other. The IMS database may be adapted to the requirements of the business organization's applications. Such application programs can access common and, therefore, consistent data, thereby reducing the need to maintain the same data in multiple ways in separate files for different applications. However, for some information management systems, this database functionality may result in the limitation that each application have a unique name in the IMS environment.

The transaction manager module of the IMS 130 may provide message-based transaction processing functionality. In some cases, a transaction may be a particular input data set that may be used to trigger execution of a particular process or job by the business organization's application. For example, a message that triggers a particular application program functionality and the return of any results, would be considered a single transaction. The IMS 130 may process input messages received from a variety of sources (e.g., workstations, network interfaces (e.g., an Internet interface), and the like) and process output messages from the application program. To manage this messaging communication, the IMS system may provide an underlying queueing mechanism, which in turn, may be leveraged by the IMS router 110 to allow testing of multiple levels of an application. The IMS system provides a high-volume, high-performance, high-capacity, low-cost transaction processing functionality for a variety of database types at extremely high transaction volumes in an online, real-time environment. The IMS router 130 allows multiple users to easily test multiple versions and/or builds of an application concurrently in a high-volume, rapid-response environment, where users may be geographically dispersed, while accessing data at a centralized location.

While multiple methods may exist to configure the IMS 130 for concurrent testing of an application, the different methods may not be compatible or be easily used together. For instance, the IMS router 110 may leverage message scheduling functionality to manage concurrent testing, while other implementations may utilize code running at execution time of the transaction. Here, the IMS router 110 may use a configuration table to modify messages received from a user terminal based on an identified user, and route the message to a proper level in the IMS 130 based on a level associated with that particular user.

In some cases, an application testing environment implemented in the IMS 130 may be configured to accommodate multiple components of an application, such as the application code under test, control information describing how to access test data stored in a data store, and user interface screens associated with transactions processed by the application code and accessing the data. In the illustrative example of FIG. 1, the memory 130 may store multiple databases associated with testing of the business application, such as an application code repository 142, a test data repository 144, and a user interface repository 146. Each of the multiple databases may be associated with a different one of the containers 152, 154, 156, with each container being associated with a particular "level" (e.g., level 1, level 2, level (n−1), level n, and the like). Through use of the configuration data store 160, the user may initiate a transaction for the application by name (e.g., account_manager) and the IMS router 110 may route any messages sent by that user to the correct data container level (e.g., 1, 2, (n−1), n) based on an associated entry in the configuration data store 160. For example, the IMS router 110 may append a prefix to the program name (e.g., account_manager_level2) to any messages received from the user interface 122 associated with a user assigned to test functionality of level 2 of the application. In doing so, the IMS router 110 routes messages behind the scenes to the IMS 130, while the IMS views each level as a different application program to allow for concurrent testing activities on different copies of a same application without additional software infrastructure installations. While different applications and/or installations may not have a common messaging structure for their associated transactions, the IMS router 110 may be customized to accommodate the different naming conventions.

In an illustrative example, the configuration data store 160 may be a mainframe data set that is loaded into a virtual storage 180 of the IMS 130 for efficient run-time use. In doing so, the IMS 130 may read the data from virtual storage 180 more efficiently than if the data entries are read from a direct-access storage device (DASD). However, the configuration data store 160 may be stored externally to the IMS system, in addition to or in place of the mainframe data set loaded in virtual storage 180, if desired. For example, the configuration data store 160 may be configured as a lookup table, a relational database, a spreadsheet or the like. Each entry in the configuration data store may include a user identifier, an application identifier, and an assigned level. Each user may be assigned a unique user identifier, such as a user name, a workstation name, or other identification. In some cases, the user may perform software testing of one or more applications. For example, the user may be associated with an assigned level to be tested. In an illustrative example, the user's entry in the data table includes an assigned level of the associated application on which the user is assigned to perform tests. In some cases, the configuration data store 160 may be populated by an external application (e.g., a testing resource manager) that assigns testing resources to one or more concurrent testing activities (e.g., pipelines). In some cases, the user, or user's manager, may access a configuration interface (e.g., a user interface screen) for managing the user's testing configuration. For example, a workstation may include a configuration screen having at least a user identifier field, an application field, and a testing level field. The user identifier field may be prepopulated with the user information, such as by using user login information. The application field and/or the testing level field may each be customized by the user based on an assigned testing project. The user interface screen may include one or more user interface buttons, such as a load button to load and populate a user configuration screen with a saved test configuration associated with the user from the configuration data store 160 and a save button to save a user configuration from the user configuration screen to the configuration data in virtual storage 180.

The IMS router 130 may monitor communication received from one or more users. Based on an user identifier associated with the message, the IMS router 130 may access the configuration data in virtual storage 180 to retrieve application and level information associated with the user identifier. Based on the user entry in the configuration data in virtual storage 180, the IMS router may modify the transaction communication and route the transaction message to the IMS 130 to access the desired testing pipeline container (e.g., account_manager_10, account_manager_n, and the like), including an application container 152, a test data container 154, and a user interface screen container 156, associated with the assigned testing level. When the user desires to test functionality at a different level (e.g., a functionality build level, a release build level, and the like), the user or resource manager may modify an assigned testing level in the configuration data table. Multiple individuals may be assigned to each level and the IMS router 110 may route transaction messages from each of a plurality of users to the IMS 130 based on the configuration data in virtual storage 180.

The test container of the IMS 130 may be "sliced" vertically into the data containers 152, 154, 156. Each application may have a different number of data containers, such as 10, 20, 50, 90, based on a desired testing structure. In some cases, each application may be associated with an application data container, where each level or pipeline is associated with a different build of the application, such as a current release build, one or more previous release builds, one or more beta test builds, and/or one or more intermediate builds designed to test a new feature or defect fix. Each level or pipeline may be associated with an application container comprising the desired build of the application to be tested, a test data container including test data associated with the test build. The test data containers may differ between pipelines due to the fact that different versions of the applications may include more or less features and may require different data to be available to support such features. Similarly, each associated user interface pipeline also may differ between application builds to support different functionality and/or data requirements of each build. As such, each application may be scaled horizontally (e.g., different versions of the application), without scaling the IMS 130 "vertically" (e.g., without increasing processor consumption, virtual or physical memory use, and the like).

Figure 2:
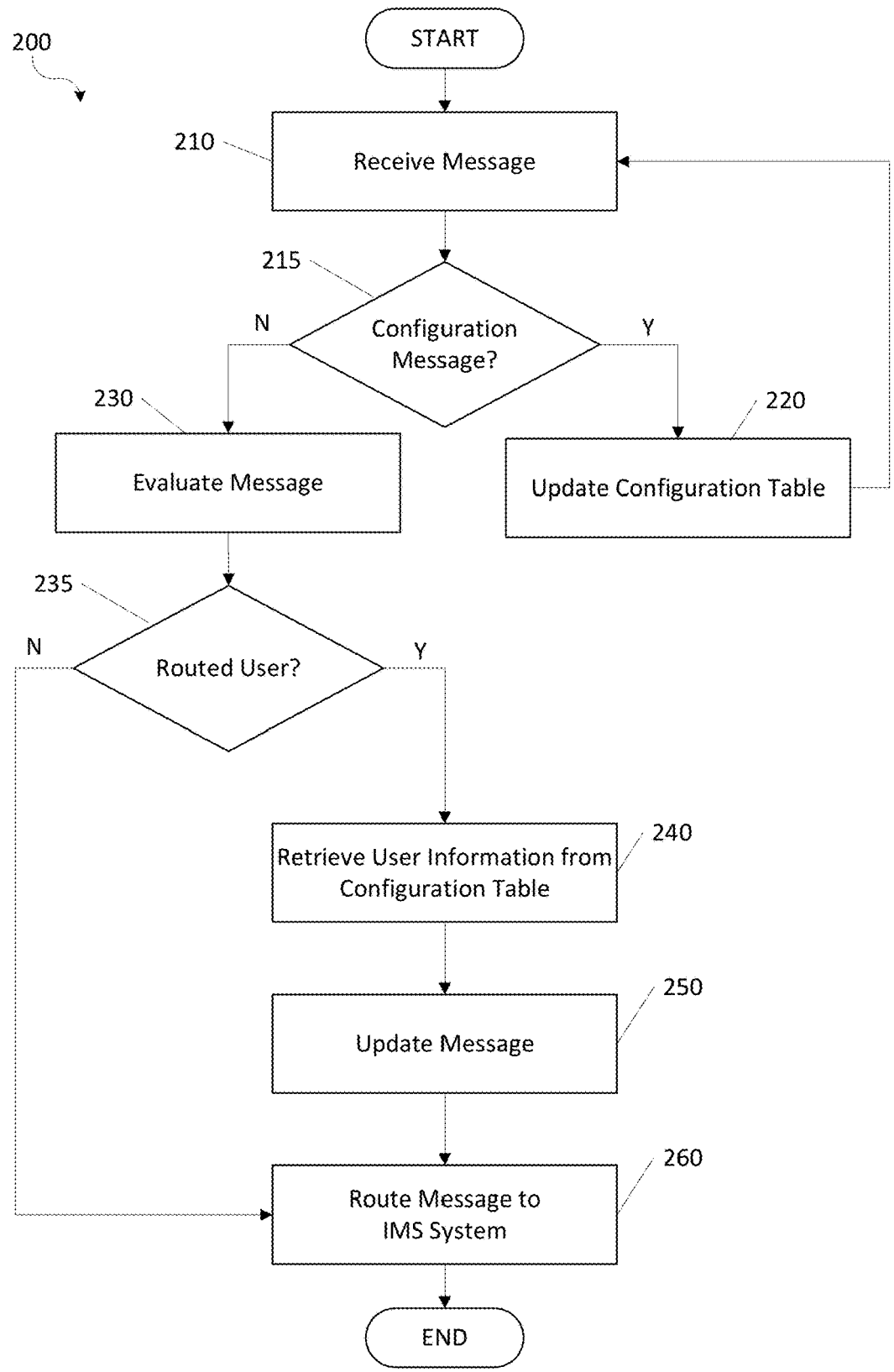
FIG. 2 shows an illustrative method of routing messages in an information management system environment in accordance with one or more aspects described herein.

FIG. 2 shows an illustrative method 200 of routing messages by an IMS router 110 in an information management system environment in accordance with one or more aspects described herein. At 210, the IMS router 110 may monitor communications to the IMS 130 associated with an application, as received from one or more user interface devices 122, 124. The IMS router 110, at 215, may determine whether a particular communication is a transaction message or a configuration message. If the IMS router 110 identifies a configuration message, the IMS router processes may route the configuration message to a configuration manager application for processing and storage of the configuration message in the configuration data in virtual storage 180. Alternatively, the IMS router 110 may process the configuration message and generate or modify an entry in the configuration data in virtual storage 180 associated with a particular user, where the entry includes a user identifier, an application identifier, and a level identifier. Upon storage, IMS 110 may return to monitoring communications and processing a subsequent message at 210. If, at 215, the message is not a configuration message, the IMS router will analyze the content of the message to identify a user or user device associated with the message and extract user or device identification information.

At 235, the IMS router 110 may compare the extracted user identification information with entries in the configuration data in virtual storage 180. If the IMS router 110 does not match the user identifier information with an entry in the configuration data table, the IMS router 110 routes the message to the IMS 130 at 260. If, at 235, the IMS router 110 matches the user identifier and/or the application information to an entry in the configuration data in virtual storage 180, the IMS router 110 retrieves the user configuration entry from the configuration data in virtual storage 180 and modifies the message based on a level identifier associated with the user configuration entry at 250. The IMS router 110 then routes the modified message to the IMS 130 at 260.

In an illustrative example, the IMS router 110 may use separate entry points (e.g., transaction manager functions, messaging functions) to facilitate testing library switching between application levels. For example, identifiers in the messages may be used to determine whether a function call is running a production or test IMS system. When in production, the IMS 130 may process only XTalk transactions. When testing, the IMS 130 may process XTalk requests, support multiple levels of transactions, PSBs, and databases, and MFS libraries. In some case, a class assigned to an input message will determine the routing eligibility of the message. In some cases, standard IMS functionality may be customized within a terminal routing routine to provide application developers with the ability to change the destination name of an IMS input message immediately after it has been received from a particular input device, network device, client, and/or transaction driven programs. Routing entry points may not be customized and may not change destination names but will only return control to the calling routine. Functionality available in an IMS production environment may be limited to the routing of XTALK transactions from specified devices only. Input messages that are received via a Multiple Systems Coupling (MSC) link are delivered to and processed by the IMS 130. Messages processed may be routed to a partner IMS system by utilizing an MSC link if the SMB destination is defined as remote.

The purpose for re-routing input messages was driven by the need to segregate online IMS testing activities through the use of redundant groups of IMS databases, transaction names, application programs, and MFS format libraries where each group is identified by a unique level. This allows application developers to test program and databases changes in a unique and segregated test environment. In some cases, application environments may be able to control up to 99 levels of applications, MFS format library pairs, and IMS databases. Each redundant grouping of databases and libraries may utilize a unique identifier (e.g., a three byte level identifier) to differentiate between application environments. A Userid or terminal identifier (LTERM) may be assigned to a specific application level in the Static Router Table dataset, which may contain Userids/LTERMs and their assigned level and is loaded into virtual storage 180 during IMS Control Region start-up and initialization. Following an IMS Control Region initialization, the IMS router 110 may use the configuration data in virtual storage 180 and not from a static router table dataset (e.g., the configuration data store 160). Also, any Userid or LTERM can be dynamically added, or its level re-assigned through the RTS system, using the a particular command.

A subroutine processed by the IMS router 110 may determine that a transaction is routable after finding a match between the Userid/LTERM from the configuration data in virtual storage 180 and the Userid/LTERM associated with the current transaction, it then may branch to the routine name associated with that transaction class where the incoming destination name will be changed to the a modified name derived from the configuration information. The IMS router 110 will then use the modified name as the transaction name by replacing the first three bytes of the corresponding program name with the desired level from the configuration match (e.g. F10, I32, etc.) in a first illustrative system configuration and by replacing the fourth position of the transaction with the desired level from the configuration match (e.g. A, C, etc.) in a second illustrative system configuration. This works the same regardless of a message source.

A lookup is performed by the Router exit to determine the class of an input transaction. If a match of the class from the SMB lookup is found in the branch table then the routine associated with that class is invoked. Once the input message has been deemed routable, the LTERM/Userid entry from the configuration data in virtual storage 180 must be located to determine that routing level. In some cases, users may provide LTERM terminal identifier information in an LTERM override field of a message header, which is then passed to this exit. The LTERM is then checked against each entry of the configuration data in virtual storage 180 for a match. If the level found in the matching LTERM/Userid table entry is a particular entry (e.g., _00), no routing will occur, since level '00' is considered non-routable. Also, if no user identifier match is found in the configuration data store, no routing will occur. Any level other than "_00" will cause the PSB name obtained from the previous lookup to be used to overlay the transaction code from the input message. In some cases, the first three characters of a transaction code may be derived by replacing the first three bytes of the corresponding program name with the desired level from the configuration match (e.g. F10, I32, etc.) for the first illustrative system configuration and by replacing the fourth position of the transaction with the desired level from the configuration match (e.g. A, C, etc.) in the second illustrative system configuration. Any length differences will be resolved and the new length saved in the message.

In some cases, a message header may provide a way for the IMS router 110 to associate a particular delivered transaction with a valid LTERM/Userid, as required by the IMS 130. This is required to perform transaction level routing, and can be accomplished by a field in the message header. A character string provided in this field may be passed by the IMS router 110 to validate the LTERM/Userid's existence in the router table. Once validated, the transaction can then be routed to the desired level. The routing value specified should not be an actual terminal name, because this may impact routing for an actual user. In some cases, individual users may set up the router table and fields using their own User Id. For group level routing, the standard formatting may be used for the fields and router table, for example, group level routing may be accomplished by setting a field to the string a particular string having a format AAAAAAAA F I where 'AAAAAAAA'=1-8 character client/endpoint identifier and 'F' and I=level indicator. For example, AAAAAAAA F00 I00 may correspond to a model development/dress rehearsal level. AAAAAAAA F I may correspond to a different level In some cases, the IMS router may support program to program message switching functionality. For example, when an application program inserts a message, the IMS router may have an ability to reroute a transaction message by changing the destination name.

In some cases, dynamic reloading of the configuration data store 160 may be done to load a large number of changes made in partitioned dataset. This may affect online users and may cause the loss of any online changes made by certain transactions. A new copy of the router table may be loaded with use of a particular command or transaction.

In some cases, dynamic reloading of a called subroutine can be done to load any code changes to the without bringing the IMS Control region down and back up. However, this may affect online users. Additionally, the IMS router 110 may include trace processing functionality, where the functionality may be enabled/disabled through use of transaction commands (e.g., a trace on command, a trace off command, and the like).

In some cases, the IMS router 110 may modify a message format for routing based on an application format and message format for a particular IMS environment. In some cases, a level indicator may be numerical. In other cases, the level indicator may be alphanumerical. In some cases, the level indicator may be appended to an application name in a transaction message. In some cases, a level indicator may be inserted at a particular character location in a character name string. For example, a transaction having a name "xxxPxxx" may be levelized to "xxxXxxx", where X is the level (e.g. X, Y, W, and the like). In some cases, a transaction name may be levelized by appending a level to a particular name, for example, transaction "AAA" may be levelized to "AAAx" or transaction "MFC1T99" may be levelized to "MFCxT99", where 'x' is the level. Such naming conventions are illustrative and are not meant to be limiting. Other naming conventions may be contemplated to facilitate level identification.

Figure 3:
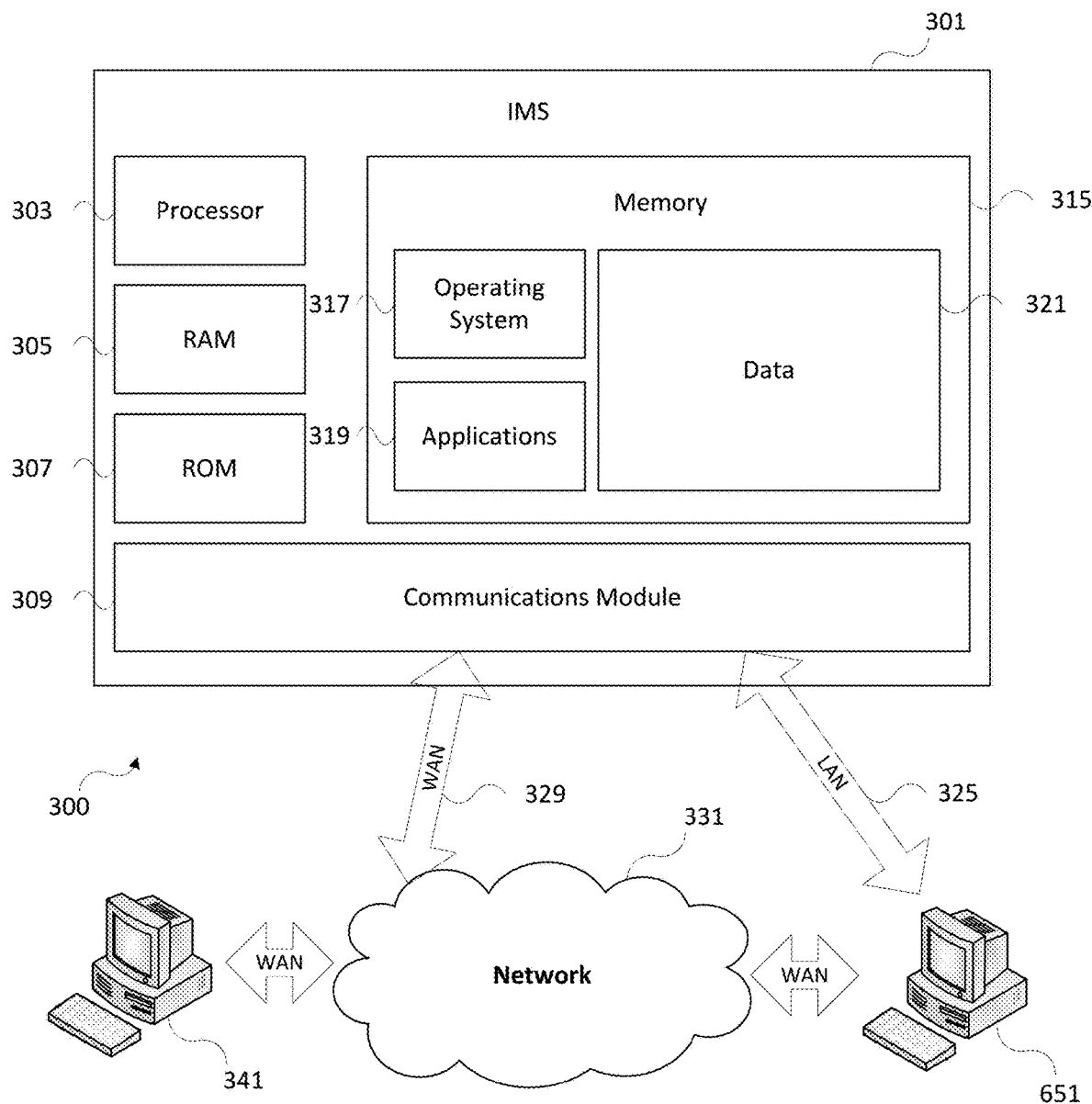
FIG. 3 shows an illustrative operating environment in which various aspects of the disclosure may be implemented in accordance with one or more aspects described herein.

FIG. 3 shows an illustrative operating environment in which various aspects of the present disclosure may be implemented in accordance with one or more example embodiments. Referring to FIG. 3, a computing system environment 300 may be used according to one or more illustrative embodiments. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 may include an illustrative IMS router 301 having a processor 303 for controlling overall operation of the IMS router 301 and its associated components, including a Random Access Memory (RAM) 305, a Read-Only Memory (ROM) 307, a communications module 309, and a memory 315. The IMS router 301 may include a variety of computer readable media. Computer readable media may be any available media that may be accessed by the IMS router 301, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the IMS router 301.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 303 of the IMS router 301. Such a processor may execute computer-executable instructions stored on a computer-readable medium.

Software may be stored within the memory 315 and/or other digital storage to provide instructions to the processor 303 for enabling the IMS router 301 to perform various functions as discussed herein. For example, the memory 315 may store software used by the IMS router 301, such as an operating system 317, one or more application programs 319, and/or an associated database 321. Also, some or all of the computer executable instructions for the IMS router 301 may be embodied in hardware or firmware. Although not shown, the RAM 305 may include one or more applications representing the application data stored in the RAM 305 while the IMS router 301 is on and corresponding software applications (e.g., software tasks) are running on the IMS router 301.

The communications module 309 may include a microphone, a keypad, a touch screen, and/or a stylus through which a user of the IMS router 301 may provide input, and may include one or more of a speaker for providing audio output and a video display device for providing textual, audiovisual and/or graphical output. The computing system environment 300 may also include optical scanners (not shown).

The IMS router 301 may operate in a networked environment supporting connections to one or more remote computing devices, such as the computing devices 341 and 351. The computing devices 341 and 351 may be personal computing devices or servers that include any or all of the elements described above relative to the IMS router 301.

The network connections depicted in FIG. 3 may include a Local Area Network (LAN) 325 and/or a Wide Area Network (WAN) 329, as well as other networks. When used in a LAN networking environment, the IMS router 301 may be connected to the LAN 325 through a network interface or adapter in the communications module 309. When used in a WAN networking environment, the IMS router 301 may include a modem in the communications module 309 or other means for establishing communications over the WAN 329, such as a network 331 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 4:
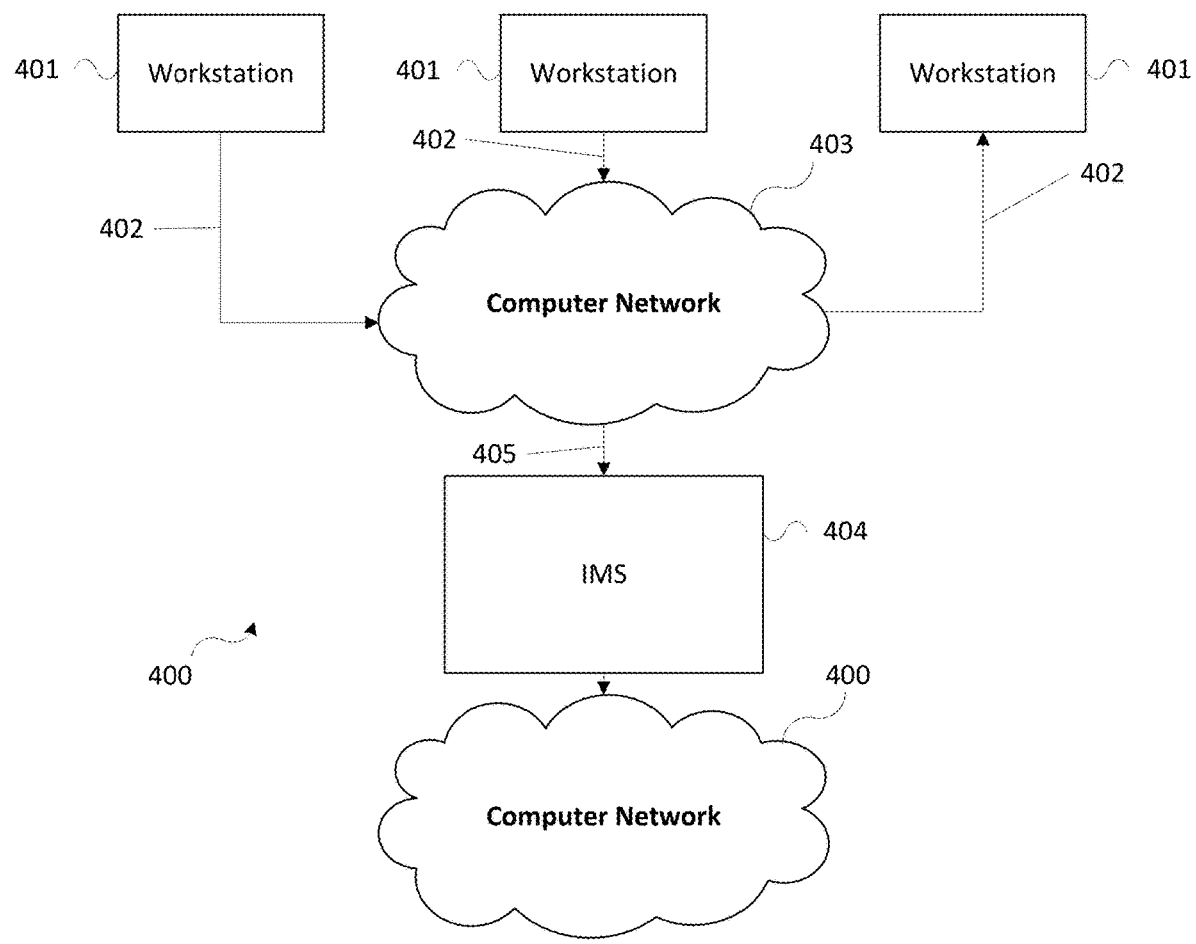
FIG. 4 shows an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. As illustrated, the system 400 may include one or more workstation computers 401. The workstation 401 may be, for example, a desktop computer, a smartphone, a wireless device, a tablet computer, a laptop computer, and the like, configured to perform various processes described herein. The workstations 401 may be local or remote, and may be connected by one of the communications links 402 to a computer network 403 that is linked via the communications link 405 to the IMS router 404. In the system 400, the IMS router 404 may be a server, processor, computer, or data processing device, or combination of the same, configured to perform the functions and/or processes described herein. The server 404 may be used to receive check images and associated data and/or validation scores, retrieve user profile, evaluate the check image compared to the user profile, identify matching or non-matching elements, generate user interfaces, and the like.

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the IMS router 404, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A system, comprising:
    a plurality of computing devices, each computing device corresponding to a different user; and
    an information management system comprising:
    at least one processor;
    a communication interface communicatively coupled to the at least one processor; and
    memory storing computer-readable instructions that, when executed by the at least one processor, cause the information management system to:
        partition a test container of the information management system into a plurality of logical test containers, each of the logical test containers corresponding to logical test environment associated with a different build of an application under test and wherein each logical test container is associated with a different user group, wherein a first logical test container comprises a first test container for a first build of the application under test by a first user group and a second logical test container comprises a second test container for a second build of the application under test by a second user group and wherein the first test container supports different available data than the second test container;
        receive, by an information management system (IMS) router and via the communication interface, a message from a computing device of the plurality of computing devices;
        identify, from the message, a user identifier associated with the computing device of the plurality of computing devices;
        retrieve, based on the user identifier, a level identifier associated with an application build level of, wherein the level identifier corresponds with a test container of the plurality of logical test containers associated with a particular build of the application under test in a logical test environment of the information management system and associated with one or more users associated with the user identifier;
        generate, based on the user identifier, a modified message by appending a message modifier comprising the level identifier to the message, wherein the user identifier is associated with a user of the first user group and the second user group; and
        communicate, by the IMS router the modified message to a pipeline of one of the first logical test container or the second logical test container of the plurality of logical test containers based on the message modification, wherein the pipeline corresponds to the level identifier.

2. The system of claim 1, wherein the message comprises an information management system transaction.

3. The system of claim 1, further including instructions that, when executed, cause the information management system to:
    receive a configuration message; and
    update, in a configuration data store, a configuration entry with configuration information extracted from the configuration message.

4. The system of claim 3, wherein the configuration information comprises the level identifier.

5. The system of claim 1, wherein the information management system comprises an information management system router.

6. The system of claim 1, wherein the message modification comprises appending the level identifier to an application name.

7. The system of claim 1, wherein the message modification comprises replacing a character in a character string with the level identifier.

8. An apparatus, comprising:
    at least one processor;
    a communication interface communicatively coupled to the at least one processor; and
    memory storing computer-readable instructions that, when executed by the at least one processor, cause the apparatus to:
        identify a user identifier associated with a message received via the communication interface;
        retrieve, based on the user identifier, a level identifier associated with an application, wherein the level identifier corresponds with a logical test container corresponding to particular build of the application under test in a logical test environment of a plurality of logical test environments, each logical test environment associated with one of the logical test containers of an information management system and by one or more users associated with the user identifier, wherein a first logical test container comprises a first test container for a first build of the application under test by a first user group and a second logical test container comprises a second test container for a second build of the application under test by a second user group and wherein the first test container supports different available data than the second test container;

generate a modified message based on the level identifier and the user identifier by appending a message modifier comprising the level identifier to the message, wherein the user identifier is associated with a user of the first user group and the second user group; and communicate the modified message to a pipeline of one of the first logical test container or the second logical test container corresponding to a particular build of the application under test, based on the message modification, wherein the pipeline corresponds to the level identifier.

9. The apparatus of claim 8, wherein the message comprises an information management system transaction.

10. The apparatus of claim 8, further including instructions that, when executed, cause the apparatus to:
receive a configuration message; and
update, in a configuration data store, a configuration entry with configuration information extracted from the configuration message.

11. The apparatus of claim 10, wherein the configuration information comprises the level identifier.

12. The apparatus of claim 8, wherein the apparatus comprises an information management system router.

13. The apparatus of claim 8, wherein the message modification comprises appending the level identifier to an application name.

14. The apparatus of claim 8, wherein the message modification comprises replacing a character in a character string with the level identifier.

15. A method, comprising:
dividing a test container of an information management system into a plurality of logical test containers, wherein the test container is associated with an application and each logical test container is associated with a different build of the application, wherein a first logical test container comprises a first test container for a first build of the application under test by a first user group and a second logical test container comprises a second test container for a second build of the application under test by a second user group and wherein the first test container supports different available data than the second test container;

receiving, at a communication interface, a message comprising an information management system transaction;

identifying, from the message received by the communication interface, a user identifier associated with the message received via the communication interface;

retrieving, based on the user identifier from a configuration data store, a level identifier associated with the application, wherein the level identifier corresponds with a logical test environment of a plurality of logical test environments of an information management system, wherein each logical test environment is associated with a particular build of the application being tested by one or more users associated with the user identifier;

generating a modified message based on the level identifier and the user identifier, wherein the message modification comprises appending a name of the application and the level identifier to the information management transaction, wherein the user identifier is associated with a user of the first user group and the second user group; and sending a modified message to a logical test container of a plurality of logical test containers of the information management system, wherein the information management system routes the message to a pipeline of one of the first logical test container or the second logical test container based on the message modification, wherein the pipeline corresponds to the logical test container associated with the level identifier.

16. The method of claim 15, wherein the message comprises an information management system transaction.

17. The method of claim 15, further comprising:
receiving, at a communication interface, a configuration message; and
updating, in the configuration data store, a configuration entry with configuration information extracted from the configuration message.

18. The method of claim 15, wherein the configuration data store comprises the level identifier.

19. The method of claim 15, wherein the message modification comprises appending the level identifier to an application name.

20. The method of claim 15, wherein the message modification comprises replacing a character in a character string with the level identifier.

* * * * *